United States Patent [19]

Keen

[11] Patent Number: 5,039,541

[45] Date of Patent: Aug. 13, 1991

[54] METHOD OF PRODUCING A SUBSTANTIALLY STEROL FREE FAT OR OIL

[75] Inventor: Alan R. Keen, Palmerston North, New Zealand

[73] Assignee: New Zealand Dairy Research Institute, Palmerston North, New Zealand

[21] Appl. No.: 159,837

[22] Filed: Feb. 24, 1988

Related U.S. Application Data

[63] Continuation-in-part of Ser. No. 774,968, Sep. 11, 1985, abandoned.

[30] Foreign Application Priority Data

Sep. 11, 1984 [NZ] New Zealand .................... 209508

[51] Int. Cl.$^5$ .................... A23D 7/00; A23D 9/00
[52] U.S. Cl. .................... 426/417; 426/419; 426/491; 426/422; 426/423; 426/601; 260/427
[58] Field of Search ............ 426/417, 491, 422, 423, 426/586, 601, 417; 260/427; 210/635

[56] References Cited

U.S. PATENT DOCUMENTS

| | | | |
|---|---|---|---|
| 692,283 | 2/1902 | Harris | 426/417 |
| 2,418,819 | 4/1947 | Coggins et al. | 260/427 |
| 4,296,141 | 10/1981 | dePaolis | 426/613 |
| 4,366,174 | 12/1982 | Kneubuehl et al. | 426/582 |
| 4,664,807 | 5/1987 | Van Dam et al. | 210/656 |

OTHER PUBLICATIONS

Swern, D. Bailey's Industrial Oil and Fat Products, 3rd Ed. 1964, pp. 771–786.

*Primary Examiner*—Marianne Cintins
*Attorney, Agent, or Firm*—Reed Smith Shaw & McClay

[57] ABSTRACT

A process for removing sterols and specifically cholesterol from fats or oils such as anhydrous milk fat by passing liquid fat or oil over an absorbent or adsorbent material, where the ratio of fat or oil to absorbent or adsorbent is from preferably about 0.8:1 to 0.3:1.

14 Claims, No Drawings

METHOD OF PRODUCING A SUBSTANTIALLY STEROL FREE FAT OR OIL

RELATED APPLICATIONS

This application is a continuation-in-part of application of Ser. No. 774,968, filed on Sept. 11, 1985, now abandoned claiming priority on New Zealand Patent Application No. 209508 filed on Sept. 11, 1984.

FIELD OF THE INVENTION

This invention relates to methods of removing compounds at least one of which is a selected compound from fats and oils and/or fats and oils from which such compounds have been removed, and in particular for the removal of cholesterol from milkfat.

BACKGROUND OF THE INVENTION

It is generally well known to treat various edible oils and fats to remove objectionable color or flavors. For example, U.S. Pat. No. 692,283 discloses the removal of color impurities with powdered animal charcoal by mixing such charcoal with fish oil, olive oil and the like which are typically used for dietetic or medicinal purposes. In *Bailey's Industrial Oil and Fat Product.* Swern, pp.771-77 (1964), various materials such as clay, activated clay, activated carbon are taught as useful in bleaching oils. In particular, Swern teaches using carbon in an amount of about 0.2% to the oil. The use of carbon is preferably always with a bleaching earth. Further, the activity of an adsorbent can be measured by the Freundlich constant,[1] K, the value of which in the examples given varies between 0.25 and 7.2 (with a mean of 1.48) for most active adsorption bleaching processes.

Freundlich equation $Kc^n = x/m$ where $x$ = the amount of substance adsorbed, $m$ = amount of adsorbent, $c$ = amount of residual substance and K and n are constants.

Other processes for improving or enhancing edible and nonedible oils are known in the art. See, for example, U.S. Pat. Nos. 4,112,129 (reducing free fatty acid and color degradation in cooking oils); 3,450,541 (separating sterols from a liquid mixture); 2,418,819 (removal of water and soaps from oil or fat by percolation); 3,519,435 (fractionation of milk fat); 4,443,379 (adsorptive bleaching of edible oils using Group VIII metal cations and bleaching clays); and 4,005,228 (milk fat crystallization using an acetone solution). Also, PCT application GB82/00327 (method for refining fats using organic solution with adsorption agent).

A number of processes have been directed to the reduction of cholesterol in egg products, for example, U.S. Pat. Nos. 3,987,212; 3,941,892 and 3,563,765. However, few, if any, processes have been successful in reducing or eliminating sterols such as cholesterol in milk fats and like products. In Belgium patent 862,264, however, a method for reducing the cholesterol content of butter by using molecular vacuum distillation is disclosed. It is reported that initial cholesterol content can be reduced by 70-90% using this method.

Granulated carbon processes have been used with dairy products to remove antibiotics or residues from milk, rancidity, and for acid hydrolysis and purification of lactose in whey. The action of bleaching earths on cholesterol was reported in *Alteration of Sterol by Industrial Processing of Fats and Oils.* by E. Homberg, Fette, Seifen, Anstrichmittel v.76 pp.433-35 (1974). The report focuses on the formation of cholesterol derivatives during the treatment with active earth.

Notwithstanding the dietary advantages in reducing or eliminating cholesterol and its derivatives and other sterols from milk fat products, there have been few processes which provide for large commercial scale removal. Moreover, it is desirable to reduce such cholesterols in fats in such a way as to leave a product useful for the production of edible processed foods.

SUMMARY OF THE INVENTION

It is an object of the present invention to provide a method of removing at least some of compounds at least one of which is a selected compound from fats and oils and/or fats and oils from which such compounds have been removed which will at least provide the public with a useful choice.

Accordingly, one aspect of the invention consists in a method of removing at least some of the objectionable compounds, one of which is a selected compound from fat and/or oil. This method comprises the steps of maintaining the fat and/or oil in a liquid condition and passing the liquid fat and/or oil over a large amount of absorbent or adsorbent material. The absorbent or adsorbent material is such as to remove at least the selected compound from the fat or oil.

In the present invention it has been found that a very large amount of absorbent is required to achieve successful removal of cholesterol and its derivatives such as cholesterol oxides. In fact, the Freundlich constant K is about 63 for the adsorption of cholesterol from milk fat. This is to be contrasted with a value of about $K = 7$ for decolorization of milkfat using carbon. Generally, the present invention involves maintaining the oil or fat in a liquid state and thereafter contacting it with an adsorbent to remove the sterol. Preferably the adsorbent is selected from the group consisting of granulated carbon, activated carbon, carbon adsorbents impregnated with metal salt or organic compounds, porous glass, porous glass impregnated with metal salts or organic compounds or containing chemically bonded groups, porous ceramic, porous plastics, aluminas, silicates, magnesia's and derived compounds including Florisils.

In order to remove substantially all of the cholesterol from milkfat (that is, for example, to levels of approximately 50 ppm cholesterol), it is necessary to use a very large quantity of adsorbent. Generally, it has been found that with unenhanced adsorbents such as an activated carbon, a batch process using 5% carbon based on the weight of the oil will remove between 40 and 50% of the cholesterol. In such a process cholesterol levels of 50 ppm and less are achievable by successive treatments which require the use of at least 35% by weight adsorbent. In a continuous process using the same carbon these levels of cholesterol are achieved with 10% by weight of adsorbent or absorbent. In a preferred embodiment of the invention using a continuous process a greater than 90% reduction in cholesterol was effected when the ratio of oil to adsorbent was from 0.8:1 to 0.3:1 depending on the adsorbent used. In conventional color removal from fats and oils the ratio is typically 20:1 to 100:1 and in the case of milkfat a ratio of 176:1 is typical. Enhanced adsorbents can achieve substantial removal of cholesterol using reduced amounts of adsorbents.

The present invention can take advantage of either a fixed column or a pulsed column of adsorbent to achieve a reduction or elimination of the sterols from the fat or oil. However, the advantages of the present invention will become apparent from a perusal of the following detailed examples set forth in the preferred embodiments. The preferred embodiments also disclose the best mode of carrying out the method above-described.

PREFERRED EMBODIMENTS OF THE INVENTION

In one of the preferred forms of the invention it is envisaged that an oil and/or fat, for example fats and oils of vegetable and/or animal origin (including fish fats and/or oils), is treated with an absorbent. This method is described in relation to the removal of cholesterol from anhydrous milkfat.

To put the method into operation, the oil and/or fat is maintained at a temperature which maintains the fat and/or oil liquid and preferably which reduces the viscosity of the liquid fats and oils to a value which facilitates adsorption or absorption of the desired components on to or into the active adsorbents or absorbents. Preferably the treating material comprises an adsorbent which include active carbons, earths and clays, aluminates, silicates, magnesia's and synthetic compounds from these (e.g., florisils), either pulverized or granulated, or porous glass, plastics or ceramics. Most preferably the absorbent is in particulate condition.

During repeated or continuous contact with the adsorbent some oils and fats may lose their characteristic flavor, color and oxidative stability. After deodorization for example by using equipment common to the vegetable oil industry, undesirable flavors are removed from the treated oil or fat. Both desired color, flavor and oxidative stability may be added back using natural, nature identical, or artificial components.

The process may be carried out either as a continuous or batch process. As an example of the continuous method, a hot milkfat such as anhydrous milkfat is maintained at a temperature above its melting point (e.g., 40° C.) and preferably between 70°-90° C. and is slowly percolated through a column of granulated (12×40 mesh) active carbon (type APC, Calgon Corporation, Pittsburgh, PA, U.S.A.). The initial fractions obtained were substantially cholesterol free.

In a batch procedure, a quantity of milk fat, such as anhydrous milkfat, is held at 70°-90° C. and is vigorously stirred with 2.5% active pulverized carbon (type NAP, Calgon Corporation, Pittsburgh, PA, U.S.A.) for one hour. After this period of time the pulverized carbon is removed by filtration and the process is repeated a number of times until the milkfat is cholesterol free or substantially free of cholesterol.

In a preferred continuous procedure, a pulsed bed of APC granulated carbon (12×40 mesh) is used. Anhydrous milkfat (AMF) at an elevated temperature (e.g., 80° C.) is pumped at a controlled rate up through the carbon column. The carbon column is pulsed (i.e.. a fresh portion of granulated carbon is added to the top of the column and an equivalent portion of spent carbon removed from the bottom of the column) at intervals selected to maintain the desired level of cholesterol (zero or relatively low) in the treated AMF.

The treated AMF can then be deodorized in a vegetable oil deodorizer and stabilized against oxidative deterioration by the addition of a suitable antioxidant, preferably natural additives such as Eastmans (USA) Tenox GT-1 or Vitamin E 4-50. Yellow color ($\beta$-Carotene) can be restored by the addition of $\beta$-Carotene (Roche Switzerland).

The following experiments set forth examples of cholesterol removal in milkfat using both batch and continuous processing. It should be noted that deodorization and decolorization are achieved at a very early stage in the processing whereas removal of the sterols requires a very large amount of processing.

Experiment 1

Active carbon treatment of milkfat

| No. of extractions with 5% w/w active carbon | Concentration of Cholesterol $\mu g/g$ | Color ($\beta$-carotene) $\mu g/g$ | Total percentage of active carbon used W/W |
|---|---|---|---|
| 0 | 2620 | 7.5 moderately yellow | 0 |
| 1 | 1560 | 0.1 colorless (water white) | 5 |
| 2 | 890 | | 10 |
| 3 | 460 | | 15 |
| 4 | 250 | | 20 |

Experiment 2

Active earth treatment of milkfat

| No. of extractions with 5% w/w active absorbent | Concentration of Cholesterol $\mu g/g$ | Color ($\beta$-carotene) $\mu g/g$ | Total percentage. of active earth used W/W |
|---|---|---|---|
| 0 | 2620 | 7.5 moderately yellow | 0 |
| 1 | 2420 | 0.1 colorless (water white) | 5 |
| 2 | 2350 | | 10 |
| 3 | 2140 | | 15 |
| 4 | 1900 | | 20 |

Experiment 3

Active earth:carbon (10:1; w/w) treatment of milkfat

| No. of extractions with 5% w/w active absorbent | Concentration of Cholesterol $\mu g/g$ | Color ($\beta$-carotene) $\mu g/g$ | Total percentage of active adsorbent used W/W |
|---|---|---|---|
| 0 | 2620 | 7.5 moderately yellow | 0 |
| 1 | 2340 | 0.1 colorless (water white) | 5 |
| 2 | 2090 | | 10 |
| 3 | 1840 | | 15 |
| 4 | 1040 | | 20 |

Experiment 4

Active carbon treatment of fish oil

| No. of extractions with 5% w/w active absorbent | Concentration of Cholesterol $\mu g/g$ | Total percentage of active carbon used W/W |
|---|---|---|
| 0 | 2310 | 0 |
| 1 | 1550 | 5 |
| 2 | 1300 | 10 |
| 3 | 820 | 15 |
| 4 | 430 | 20 |

Experiment 5

| | Continuous carbon column treatment of milkfat | |
|---|---|---|
| Amount of carbon used | Quantity of milkfat decolorized | Quantity of milkfat decholesterolized |
| 1 kg | 176 kg | 8 kg |

Referring to Experiment 5, 176 kg of milkfat was completely decolorized in a continuous column. However, only 8 kg of the milkfat was decholesterolized showing the larger ratios necessary to decholesterolize. In fact, in this experiment, 12% carbon adsorbent was used to reduce the level of cholesterol in the 8 kg of milkfat to approximately 50 ppm.

In addition to the foregoing experiments, anhydrous milkfat (2375 μg cholesterol/g milkfat) was passed through an APC carbon column (490 mm×20 mm ID, 72.7g) at 70° C. and the cholesterol level was reduced to 29.3 μg/g milkfat. Likewise in a similar column when anhydrous milkfat was percolated through at 70° C., the natural levels of cholesterol oxides[2] present (5 cholesten-3 β-01-7-one and cholesterol 5 α, 6 α-epoxide) were completely eliminated in the first 5ml eluate collected. In addition to cholesterol, cholesterol oxides have been implicated as potent causative agents for atherosclerosis and have also been implicated as potential carcinogens. Accordingly, the removal of these oxides is extremely important.

It has also been found that when carbon (Carbon APC 12×40) was impregnated* with a selection of metal salts of differing cations and anions the capacity of the carbon for cholesterol adsorption from anhydrous milkfat was increased, in some cases very significantly. This is illustrated in the following table:
*Granulated carbon was impregnated by immersion in a 10% (w/w) aqueous solution of the metal salt at 80° C. for 2h. The carbon was removed by filtration and dried at 105° C. for 24h before use.

TABLE

| Metal Salt used to Impregnate Carbon | Concentration of Cholesterol (μg/g milkfat) in the 28th 5 ml fraction off column. |
|---|---|
| Carbon Control (mean of 3 exps) | 534.0 |
| ZnSO$_4$ | 330.6 |
| Zn(NO$_3$)$_2$ | 317.3 |
| ZnCl$_2$ | 97.4 |
| Carbon control | 500.5 |
| CaCl$_2$ | 294.0 |
| Carbon control | 674.0 |
| Mn(NO$_3$)$_2$ | 529.0 |
| MnSO$_4$ | 330.6 |
| MnCl$_2$ | 314.9 |

Also carbon was impregnated with a number of water soluble or alcohol soluble organic compounds. It was found of these organic compounds;
(a) amides, typified by urea, and
(b) nucleotides such as GMP (Guanysine monophosphate) or IMP (Inosine monophosphate),
were found to provide the greatest degree of enhancement to the process of the invention. In particular, urea and IMP markedly improved the ability of carbon to remove cholesterol from milkfat.

| Organic Compound used to Impregnate Carbon | Concentration of Cholesterol (μg/g milkfat) in the 28th 5 ml fraction off column. |
|---|---|
| Control carbon (mean of 2 exps) | 288.5 |
| Urea* | 59.0 |
| IMP+ | 258.3 |

*10% aqueous solution of urea (w/w) used to impregnate carbon.
+5% aqueous solution of IMP (w/w) used to impregnate carbon.

Thus selected organics can increase the efficiency of adsorbents to remove cholesterol (and cholesterol oxides) from anhydrous milkfat.

It should be noted that Digitonin and Tomatine, two compounds known to form insoluble adducts with cholesterol in solution and used to remove cholesterol from solution when placed in/on an inert support (Celite 545) (U.S. Pat. No. 3,450,541), did not improve the performance of carbon.

When anhydrous milkfat (2375 μg cholesterol/g milkfat) was passed through a column packed with controlled porous glass (400mm×10mm ID, 40g) at 70° C. the cholesterol concentration was reduced to a mean of 370.3 μg/g milkfat in the first 2ml of eluate. In the ninth 2ml fraction the cholesterol level was still reduced to a mean of 1650.2 μg/g milkfat. With the use of controlled pore glass it was observed that the color and some of the flavor compounds were only partially removed by the adsorbent.

Porous Glass (Corning Vycor 30×60 mesh)

Unlike carbon, under the conditions employed, metal salt impregnation[3] of porous glass evidenced little effect on the capacity of such glass to enhance cholesterol adsorption from milkfat. However, Zinc Chloride did show a slight productivity to enhance activation as was observed for carbon above. This is shown in the following table:

| Metal Salt used to Impregnate Porous Glass | Concentration of Cholesterol (μg/g Milkfat) in the ninth 2 ml fraction from the column |
|---|---|
| Porous glass control (mean of 2 exps) | 1650.2 |
| CaCl$_2$ | 1734.5 |
| MnCl$_2$ | 1622.1 |
| ZnCl$_2$ | 1597.6 |

Since the surface area for APC carbon (1525 m$^2$/g) is about 6.5 times greater than that of the porous glass investigated (230 m$^2$/g) it is contemplated that a more active porous glass may result by enhancing the capacity of the glass using different conditions or using solutions of the metal salts used to impregnate the glass which are correspondingly more dilute than those used to impregnate the carbon.
Porous glass impregnated under exactly the same conditions as for carbon with the same strength metal salt solutions.

Four porous glasses (Pierce, USA) each with different chemically bonded groups were investigated (column h$_t$ of bonded glass 362 mm, ID 10mm, weight of bonded glass 10.2g). Cholesterol values of 1652.3 μg, 767.5 μg, 935.5 μg and 1003.0 μg per g of milkfat (original value 2375 μg cholesterol/g milkfat) were obtained in the first 2 mls of eluate obtained, respectively, from columns of control pore glass with the bonded groups, Alkylamine, Aminoaryl, Carboxyl and Glycophase. These results indicate that suitable columns of adsorbent with bonded groups would be able to eliminate cholesterol (and cholesterol oxides) from milkfat. (A control glass of the same porous specification was not available for comparison purposes).

PRODUCTION OF DECHOLESTEROLIZED MILKFAT

The following procedures describe a small production method for producing decholesterolized milk fat using a fixed and pulsed carbon column.

1. Fixed Column Mode

Anhydrous milkfat (2600 µg cholesterol/g milkfat) at 40° C. was pumped at 80ml/min through a column of carbon (APC 12×40 mesh) 13.7 meters long by 5.1 cm internal diameter held at 70° C. This column contained 9.1kg of granulated APC carbon. Approximately 74 kg of decholesterolized AMF (Cholesterol content<10 µg/g milkfat) was collected before cholesterol breakthrough occurred from the column.

2. Pulsed Column Mode

When breakthrough of cholesterol occurred from the column in 1 above 0.91 kg of fresh APC carbon was added to the end of the carbon column in the form of an add-on column 1.37m×5.1cm ID and 0.91 kg of spent carbon was removed from the column as a detachable column 1.37m×5.1 cm ID. This procedure was repeated each time breakthrough of cholesterol occurred at the end of the new add-on column. This process is repeated until the desired amount of cholesterol free (<10 µg cholesterol/g milkfat) or low cholesterol milkfat is prepared.

FILTRATION

Micro particulate carbon present in the milkfat from experiments performed in both the fixed column mode and pulsed column mode was removed by filtration of the liquid milkfat.

DEODORIZATION OF MILKFAT

Before decholesterolized milkfat obtained from the carbon column can be utilized for the manufacture of most products it may be deodorized to a bland product. A small deodorizer with a total charge capacity of 15kg milkfat was utilized. The contents of the deodorizer were heated with an electric element to 210° C. and a vacuum maintained at 8 m bar on the pump gauge. Steam was passed through the 15kg milkfat charge at 120 grams/h for 4 h when deodorization was complete. The deodorized milkfat was cooled to 40° C., packed off with added antioxident (Eastman Tenox GT-1) and stored at −5° C. until required for the manufacture of cholesterol free or low cholesterol products.

MANUFACTURE OF PRODUCTS WITH DECHOLESTEROLIZED MILKFAT

1. Manufacture of Cheese

Melted decholesterolized anhydrous milkfat (DCAMF) with added color ($\beta$-carotene) and pasteurized skim milk together in a suitable ratio were homogenized at selected pressures and temperature to provide a cream. The cream was blended into a further quantity of pasteurized skim milk to provide whole milk with a standardized milkfat content. Cheese starter was added to the milk which was then set with rennet. The coagulum was cut into cubes and stirred continuously and the whey expelled. A portion of the whey may be removed (10–70%) and replaced with water (10–70%) so as to control the pH of the finished cheese. After the appropriate acidity increase, the whey was removed from the curd and salt applied for the final moisture control. After salting and further whey drainage the salted curd was pressed into blocks. After a suitable pressing period the cheese was wrapped in a nonpermeable barrier material for curing at a temperature in the range of 5°–12° C. (Actual curing time was dependent on the desired level of flavor development required). Cheeses were obtained with excellent flavor and texture and with very low cholesterol contents.

2. Processed Cheese

Method (a)

Cheese manufactured in 1. above was added to a processed cheese kettle along with suitable emulsifying salts. After heating and mixing the molten processed cheese was packed in suitable containers and cooled.

Method (b)

Decholesterolized anhydrous milkfat, skim milk cheese, emulsifying salts, color, flavor and salt were added to a processed cheese kettle. After heating and mixing the molten processed cheese was packed in suitable containers and cooled.

Both types of proccessed cheese had excellent flavor and texture and very low cholesterol contents.

UHT - Treated Cream or Whole Milk

Decholesterolized anhydrous milkfat (DCAMF) was melted and added to a predetermined amount of emulsifiers, stabilizers, skim milk, color ($\beta$-carotene) and flavors. The appropriate amount of DCAMF was selected so as to obtain cream or whole milk with the desired milkfat content. The mixture of ingredients was heated to a selected temperature and homogenized at selected pressures to produce a stable emulsion. The resultant cream or whole milk was subjected to UHT treatment then aseptically packed. The cream and whole milk was kept refrigerated until required. The UHT products obtained had excellent flavor and physical properties in which the cholesterol content was extremely low.

4. Butter

Method (a)

Decholesterolized milkfat is melted at minimum temperatures then maintained at 40° C. in a suitable vat. The aqueous phase consisting of water, reconstituted skim milk solids, emulsifiers, stabilizers, color ($\beta$-carotene), flavor and salt (if required) was pasteurized and added to the vat. The contents of the vat were agitated and passed through a scrapped surface heat exchanger and pin worker and the butter thus produced was packaged and cooled. A butter with excellent flavor and containing an extremely low cholesterol content was obtained.

Method (b)

In another variation of this procedure, the melted decholesterolized anhydrous milkfat was added to a calculated quantity of pasteurized fresh cream. An appropriate amount of color ($\beta$-carotene) was added and the mixture processed as in (a). A butter with natural flavor and reduced cholesterol content was produced.

5. Ice-Cream

A suitable quantity of melted decholesterolized anhydrous milkfat was added to a formulation of reconstituted skim milk powder, sugar, emulsifiers, stabilizers, suitable flavors and corresponding colors which had been pasteurized. The mixture was passed through an ice-cream churn and the ice-cream produced packed and maintained suitably frozen. Ice cream with excellent flavor and with markedly reduced cholesterol content was obtained.

Shortbread Cookies

Butter from 4. above was blended with sugar, water, flour, baking powder and flavorings to a paste. The paste was chilled and then molded into portions on a baking tray. After baking in an oven at a suitable temperature for a short period of time shortbread cookies were obtained. Shortbread cookies with excellent flavor and with markedly reduced cholesterol content was obtained.

7. Candies

Butter from 4. above, liquid glucose, salt, brown sugar, white sugar, sweetened condensed milk, fondant and flavorings were placed in a pan and stirred over low heat. After gentle boiling to the correct consistency the contents of the pan were poured into a greased tray and allowed to cool. A chewy caramel was obtained. By omitting the Fondant a hard caramel was obtained. Candies with excellent flavor and with markedly reduced cholesterol content was obtained.

A suitable milkfat is thus obtained which has been used for the manufacture of a wide range of products (including dairy products) which have zero or low levels of cholesterol, i.e.. butters, cheeses, cottage cheeses, ice creams, and low cholesterol liquid milks of varying fat content. Where necessary flavor (natural, nature identical or artificial) can be used in the formulation of the products in order to restore the expected flavor of the product which is absent due to the initial treatment of the AMF.

While presently preferred embodiments have been described in particularity, the invention may be otherwise embodied within the scope of the appended claims.

What is claimed is:

1. A method for producing a substantially sterol free edible fat or oil by removing steroidal material form a vegetable, animal and fish fat or oil consisting of the steps of maintaining the fat or in a liquid condition and successively mixing and separating the said fat or oil with an adsorbent or absorbent and repeating said process until at least 50% of the steroid is removed form said fat or oil.

2. A method as claimed in claim 1, wherein said adsorbent or absorbent is present in an amount of at least 5% by weight of said fat or oil.

3. A method as claimed in claim 2, wherein said adsorbent or absorbent is present in an amount of at least 35% by weight of said fat or oil.

4. A method as claimed in claim 1, wherein the ratio of adsorbent or absorbent to fat or oil is about 1:20 to greater than 1:5.

5. A method as claimed in claim 1 wherein the absorbent or adsorbent has a Freundlich constant K of about 63.

6. A method for producing a substantially sterol free edible fat or oil by removing naturally occurring steroidal material from an edible vegetable, animal and fish fat or oil consisting of the steps of maintaining the ft or oil in a liquid condition and passing said liquid fat or oil over an absorbent or adsorbent and ceasing said process before the concentration of the steroid in said treated fat or oil reaches 50% of the original concentration.

7. A method as claimed in claim 6, wherein said adsorbent or absorbent is present in an amount of at least 1% by weight of said fat or oil.

8. A method as claimed in claim 7, wherein said adsorbent or absorbent is present in an amount of at least 10% by weight of said fat or oil.

9. A method as claimed in claim 6, wherein the ratio of adsorbent or absorbent to fat or oil is about 1:100 to greater than 1:8.

10. A method as claimed in claim 1 or 6, including the steps of heating to a temperature above the melting point of the fat or oil, and using one of fractionation to separate a liquid fat fraction from a solid fat or a solvent and converting the fat into a liquid fat.

11. A method as claimed in claim 4 or 7, wherein the concentration of the steroid material in the said vegetable, animal and fish fat or oil is reduced to a level of about 50 ppm.

12. A method as set forth in claims 1, 6, 2, 7, 3, 8, 4, or 9, wherein the absorbent or adsorbent is selected from the group consisting of carbon, activated carbon, metal salt impregnated carbon, organic impregnated carbon, porous glass, impregnated porous glass and chemically bonded glass, porous ceramics and porous plastics, both impregnated and chemically bonded, and aluminates, silicates, magnesia's and compounds derived from these.

13. A method as claimed in any one of claims 1, 6, 2, 7, 3, 8, 4 or 9, wherein the steroidal material removed is cholesterol.

14. A method as claimed in claim 1, 6, 2, 7, 3, 8, 4 or 9, wherein the said fat or oil is milkfat.

* * * * *